United States Patent [19]

Nakagawara

[11] Patent Number: 5,126,831
[45] Date of Patent: Jun. 30, 1992

[54] CLAMPING CIRCUIT

[75] Inventor: Chikashi Nakagawara, Kanagawa, Japan

[73] Assignee: Kabushiki Kaisha Toshiba, Kawasaki, Japan

[21] Appl. No.: 677,329

[22] Filed: Mar. 29, 1991

[30] Foreign Application Priority Data

Mar. 30, 1990 [JP] Japan .................................. 2-86192

[51] Int. Cl.⁵ .............................................. H04N 5/18
[52] U.S. Cl. .................................. 358/21 R; 358/34; 358/172
[58] Field of Search ............... 358/21 R, 22, 34, 172; 307/359, 362, 540, 553, 562; 328/146, 147

[56] References Cited

U.S. PATENT DOCUMENTS 4,183,050 1/1980 Tsuhiya et al. ..................... 358/34
5,010,395 4/1991 Tsuji et al. ......................... 358/44

FOREIGN PATENT DOCUMENTS 63-261961 10/1988 Japan .
63-303577 12/1988 Japan .

Primary Examiner—James J. Groody
Assistant Examiner—Kim Yen Vu
Attorney, Agent, or Firm—Cushman, Darby & Cushman

[57] ABSTRACT

In the clamping circuit, errors in direct current components contained in R, G and B signals from a matrix circuit are detected by comparing circuits and these errors are fed back to respective input capacitors through a reverse matrix circuit. The respective input capacitors are charged and discharged in response to the errors from the matrix circuit and the direct current parts of the outputs of the matrix circuit coincide so that the clamping levels of the outputs of the matrix circuit may coincide.

7 Claims, 6 Drawing Sheets

CLAMPING CIRCUIT

BACKGROUND OF THE INVENTION

1. Field of the Invention

This invention relates to a clamping circuit clamping a pedestal level, for example, of a video signal.

2. Related Art Statement

FIG. 5 is a formation diagram showing a related art of a clamping circuit.

FIG. 5 shows an example made an IC. The clamping circuit is formed of an IC block 4 shown on the right side from the broken line in the diagram and a capacitor 2 combining a coupling and clamping capacity. A signal from a signal source 1 is fed to an input terminal 5 of the IC block 4 through the capacitor 2. The signal appearing at the input terminal 5 is fed to a circuit in the next step not illustrated and is given also to a reversing input end of a comparing circuit 3. A reference level signal V ref has been given to a non-reversing input end of the comparing circuit 3. A clamping pulse has been also given to the comparing circuit 3. During this clamping pulse period, the comparing circuit 3 compares the signal level of the input terminal 5 and the level of the reference level signal with each other and outputs a current output based on the difference between them to the input terminal 5 from the output end. That is to say, the signal level of the input terminal 5 during the clamping pulse period will be clamped to the level of the reference level signal.

The clamping operation in the case that the signal from the signal source 1 is, for example, a video signal shall be explained in the following.

The video signal has a flyback period consisting of a synchronizing signal period, front porch period and back porch period, and a scanning period. The scanning period is a signal period in which the amplitude varies alternately. The front porch and back porch periods in the flyback period are flat periods in which the amplitude is flat (pedestal level). The video signal given to the input terminal 5 of the IC block 4 through the capacitor 2 is fed to the reversing input end of the comparing circuit 3. In the period of the clamping pulse input in the flat period, for example, the back porch period, the comparing circuit 3 compares the pedestal level of the video signal and the level of the reference level signal with each other and gives a current output based on the difference between them to the input terminal 5. The charged and discharged power amount of the capacitor 2 in the clamping pulse period will be controlled by the current output from the comparing circuit 3 and, after all, the pedestal level of the input terminal 5 will coincide with the level of the reference level signal. That is to say, a video signal in which the pedestal level is defined by the level of the reference level signal will be obtained at the input terminal 5. Thus, the direct current part of the video signal can be reproduced.

Another formation is possible as of a clamping circuit. However, according to the formation in FIG. 5, a clamping capacity and input coupling capacity can be used as combined, two capacitors are not required and therefore the number of pins can be reduced so as to be adapted to an IC circuit.

FIG. 6 is a formation diagram showing a related art of a clamping circuit preset in a matrix circuit forming a primary color signal from a luminance signal and color difference signals.

In the circuit in FIG. 6, the clamping circuits in FIG. 5 are provided respectively for three R, G and B axes and the signals from signal sources 1a, 1b and 1c are respectively color difference signals B-Y and R-Y and a luminance signal Y. These color difference signals B-Y and R-Y and luminance signal Y are given to input terminals 5a, 5b and 5c respectively through capacitors 2a, 2b and 2c for coupling and clamping.

A reference level signal has been given to comparing circuits 3a, 3b and 3c which output current outputs for making the pedestal levels of the signals appearing respectively at the input terminals 5a. 5b and 5c coincide with the reference level signal. A matrix circuit 6 matrix-processes the color difference signals R-Y and B-Y and luminance signal Y to form three primary color outputs G out, B out and R out. When a reference level signal of the same level is given to the comparing circuits 3a, 3b and 3c, the pedestal levels of the color difference signals R-Y and B-Y and luminance signal Y input into the matrix circuit 6 will all become equal to the level of the reference level signal. The matrix circuit 6 makes a matrix process while maintaining the pedestal level of the input video signal. It is easy to set the operating dynamic range and output level of the matrix circuit 6.

However, a lag will be produced in the pedestal levels of the output three primary color signals G out, B out and R out by a difference in the matrix process in the matrix circuit 6. When the signal thus lagged in the direct current level is given to such non-linear circuit as a γ correcting circuit, the characteristics of this non-linear circuit will remarkably vary.

The pedestal levels of the luminance signal Y and color difference signals B-Y and R-Y can be adjusted by independently setting the reference level signal given to the respective comparing circuit 3a, 3b and 3c but the pedestal levels of the primary color outputs G out, B out and R out from the matrix circuit 6 can not be independently adjusted. Therefore, in order to adjust the direct current level of one output of the primary color outputs G out, B out and R out, the reference level signals given to the respective comparing circuits 3a, 3b and 3c must be all adjusted and all the direct current levels of the B-Y, R-Y and Y signals must be readjusted. In case a γ correcting circuit in which the correction characteristic is determined by the pedestal level is adopted in the next step of the matrix circuit 6, when the reference level signal given to the respective comparing circuits 3a, 3b and 3c is adjusted, the γ correcting characteristic will also vary. Therefore, there has been a problem that it is very difficult to adjust the respective primary color outputs.

In order to solve this problem, the output of the matrix circuit 6 may be clamped once more. However, in such case, it will be necessary to provide for each axis a clamping capacitor for clamping the primary color outputs G out, B out and R out and the number of pins will increase to be at least three pins more than in the circuit in FIG. 6. This is not advantageous to the IC in which the number of pins is limited.

OBJECTS AND SUMMARY OF THE INVENTION

An object of the present invention is to provide a clamping circuit wherein the clamping level of the output signal of a predetermined signal processing circuit can be controlled without increasing the number of pins when made an IC.

Another object of the present invention is to provide a clamping circuit wherein the direct current level of respective outputs of a matrix circuit can be prevented from dispersing and can be controlled independently.

The clamping circuit of the present invention comprises a clamping and coupling input capacitor giving an input signal to a first signal processing means making a predetermined signal process, a comparing means for comparing the levels of the output of the above mentioned first signal processing means and a predetermined reference level signal and outputting the compared output and a second signal processing means for making for the above mentioned compared output a signal process reverse to the signal process of the above mentioned first signal processing means and feeding the compared output back to the above mentioned input capacitor.

The other features and advantages of the present invention will become apparent enough with the following explanation.

DETAILED DESCRIPTION OF THE PREFERRED EMBODIMENTS

Figure 1A:
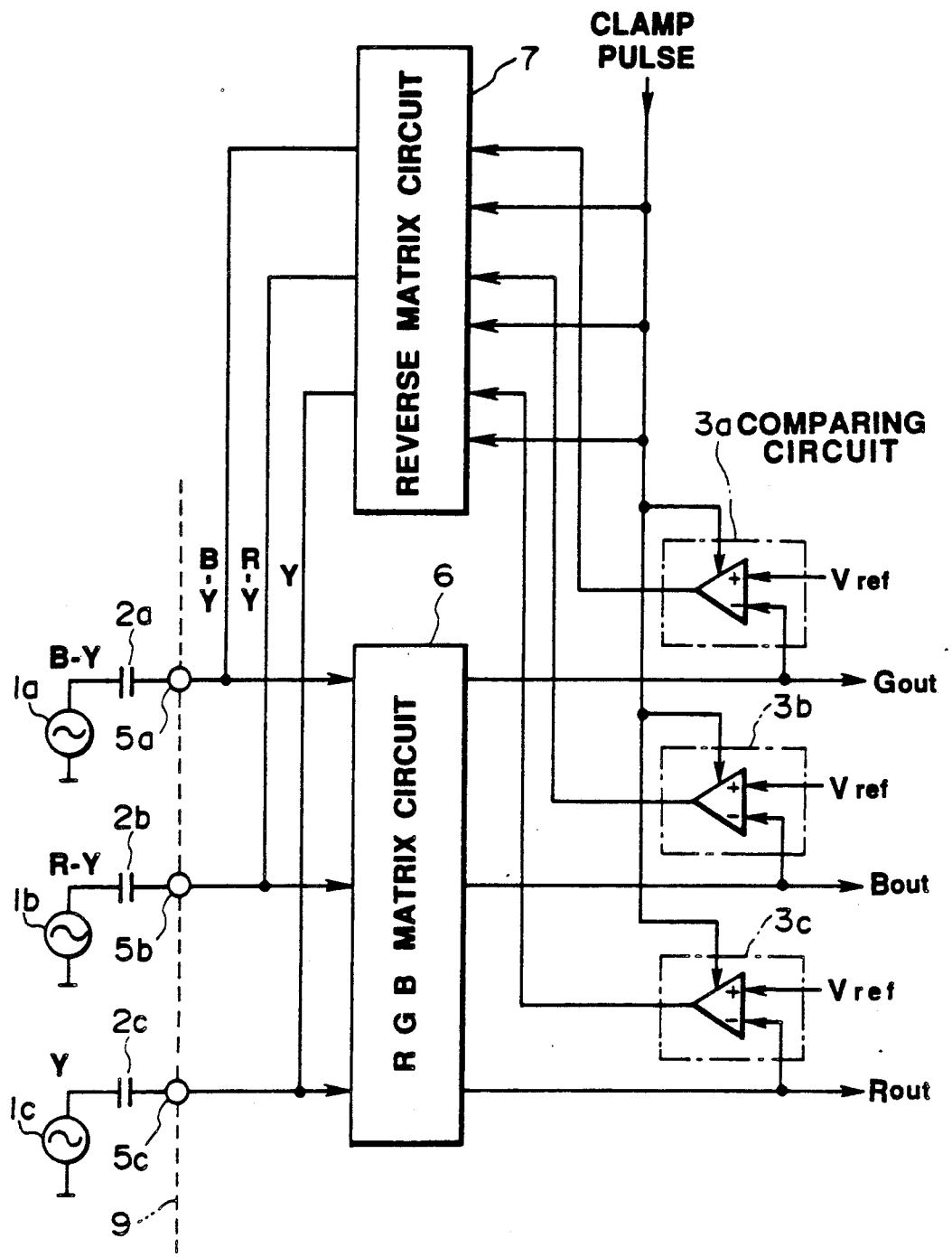
FIGS. 1(A) and 1(B) are formation diagrams showing embodiments of clamping circuits according to the present invention.

FIG. 1 is a formation diagram showing an embodiment of a clamping circuit according to the present invention.

Figure 6:
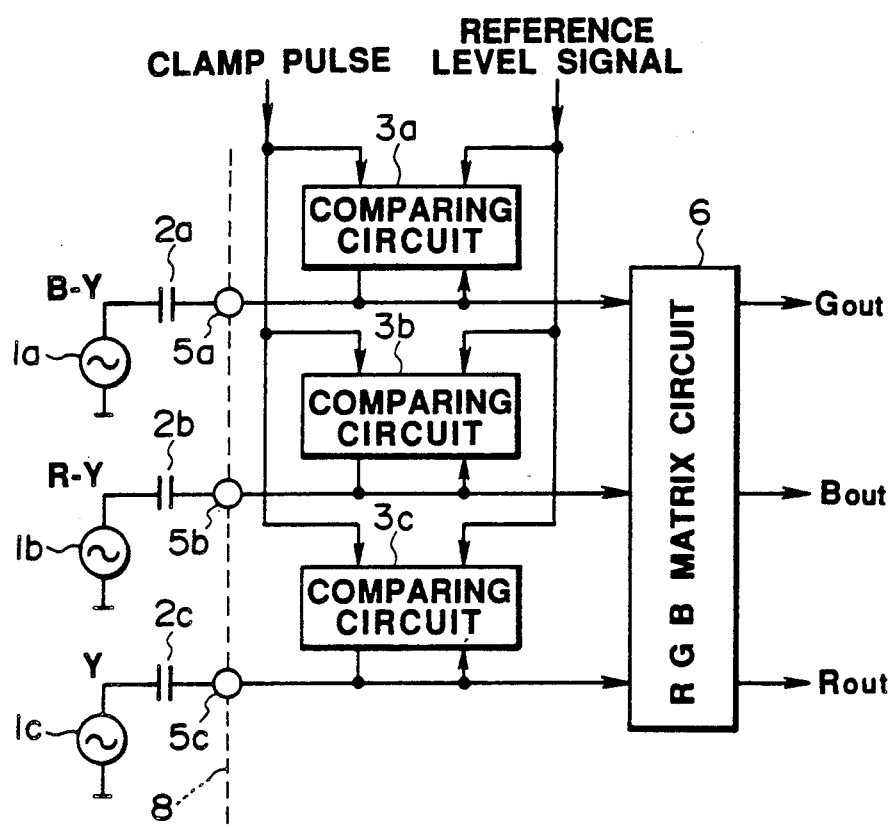
FIG. 6 is a formation diagram showing an example of a related art of a clamping circuit.

In FIG. 1, the elements common with those in FIG. 6 shall bear the same reference numerals. This embodiment shows an example of applying the present invention to a matrix circuit forming three primary color signals of two color difference signals and a luminance signal.

A B-Y signal from a signal source $1a$ is led into an input terminal $5a$ of an IC block 9 through a capacitor $2a$ combining a coupling capacity and clamping capacity. In the same manner, an R-Y signal from a signal source $1b$ and a Y signal from a signal source $1c$ are led respectively into input terminals $5b$ and $5c$ of the IC block 9 through capacitors $2b$ and $2c$ each combining a coupling capacity and clamping capacity. The B-Y signal input through the input terminal $5a$ is input into an RGB matrix circuit and is matrix-processed together with the R-Y signal and Y signal from the other input terminals $5b$ and $5c$.

Respective primary color signal outputs G out, B out and R out output by the RGB matrix circuit 6 are given to the next step circuit not illustrated and are given respectively to respective reversed input ends of clamping comparing circuits $3a$, $3b$ and $3c$. Reference level signals V ref giving clamping levels are applied to non-reversed input ends of these comparing circuits $3a$, $3b$ and $3c$. In each of the comparing circuits $3a$ to $3c$, a clamping pulse determining a clamping operation period has been input, two inputs are compared in the clamping pulse period and a current output based on the difference between the two inputs is output. The output from each of the comparing circuits $3a$ to $3c$ is given to a reverse matrix circuit 7.

In the reverse matrix circuit 7, respective outputs from the comparing circuits $3a$ to $3c$ are processed reversely to the RGB matrix circuit 6, a B-Y output, R-Y output and Y output corresponding to the respective inputs of the RGB matrix circuit 6 are produced and are returned to the respective inputs of the RGB matrix 6 with current outputs to charge and discharge the capacitors $2a$ to $2c$.

According to the above mentioned formation, in the reverse matrix circuit 7, respective primary color outputs G out, B out and R out output from the RGB matrix circuit 6 are returned to the inputs of the RGB matrix circuit 6. However, dispersed parts $\Delta$G out, $\Delta$B out and $\Delta$R out produced in the RGB matrix circuit 6 during the clamping pulse period are also included in these primary color outputs but will become nil after the lapse of time determined by the capacities $2a$ to $2c$. Thus, the dispersions produced in the respective primary color outputs G out, B out and R out output in the RGB matrix circuit 6 will become nil and the clamping levels of the primary color outputs G out, B out and R out will coincide with the reference level signal V ref.

The operation of this embodiment shall be explained in the following by determining the transmission function of the output $V_o$ of the RGB matrix circuit 6 for the reference level signal V ref.

That is to say, when the matrix A of the RGB matrix circuit 6 is made:

$$A = \begin{bmatrix} a_{11} & a_{12} & a_{13} \\ a_{21} & a_{22} & a_{23} \\ a_{31} & a_{32} & a_{33} \end{bmatrix} \quad (1)$$

and the matrix B of the reverse matrix circuit 7 is made:

$$B = \begin{bmatrix} b_{11} & b_{12} & b_{13} \\ b_{21} & b_{22} & b_{23} \\ b_{31} & b_{32} & b_{33} \end{bmatrix} \quad (2)$$

the matrix B of the reverse matrix circuit 7 including the reverse matrix of A will be represented by the below mentioned formula (3):

$$B = KA^{-1} = \frac{K}{\Delta} \begin{bmatrix} |B|_{11} & |B|_{12} & |B|_{13} \\ |B|_{21} & |B|_{22} & |B|_{23} \\ |B|_{31} & |B|_{32} & |B|_{33} \end{bmatrix} \quad (3)$$

wherein K represents any constant and $\Delta$ represents:

$$\Delta = \begin{vmatrix} a_{11} & a_{12} & a_{13} \\ a_{21} & a_{22} & a_{23} \\ a_{31} & a_{32} & a_{33} \end{vmatrix}$$

Each element $|B|_{mn}$ is represented by the following formula:

$$|B|_{mn} = (-1)^{m+n} A_{mn}$$

wherein $A_{mn}$ is a residual factor of an element $a_{mn}$ in the matrix formula $\Delta$.

If the capacity value of the clamping capacitors 2a to 2c is represented by C, the output $V_o$ of the RGB matrix circuit 6 for the reference level signal V ref when a clamping pulse is input will be able to be represented by the below mentioned formula (4):

$$\frac{V_0}{V_{ref}} = \frac{B \frac{1}{CS}}{E + B \frac{1}{CS} A} = \frac{KA^{-1} \frac{1}{CS} A}{E + KA^{-1} \frac{1}{CS} A} = \frac{K}{K + CSE} \quad (4)$$

wherein E represents a unit matrix and S represents a complex number. If sufficient time has elapsed, S→0 and therefore, $$\frac{V_0}{V_{ref}} = 1 \quad (5)$$

As evident from this formula (5), the output $V_o$ of the RGB matrix circuit 6 will become equal to the reference voltage level signal V ref.

In fact, the matrix B has a difference and therefore this influence shall be considered in the following. That is to say, as shown by the below mentioned formula (6), the reverse matrix B to which is added a matrix $\Delta A^{-1}$ representing a difference term shall be considered:

$$B = A^{-1} + \Delta A^{-1} \quad (6)$$

The transmission function of the output $V_o$ of the RGB matrix circuit 6 for the reference level signal V ref in this case will be determined as shown by the below mentioned formula (7):

$$\frac{V_0}{V_{ref}} = \frac{(A^{-1} + \Delta A^{-1}) \frac{1}{CS} A}{E + (A^{-1} + \Delta A^{-1}) \frac{1}{CS} A} = \frac{E + \Delta A^{-1} A}{ECS + E + \Delta A^{-1} A} \quad (7)$$

If sufficient time has elapsed, S→0 and therefore the below mentioned formula (8) will hold:

$$\frac{V_0}{V_{ref}} = 1 \quad (8)$$

That is to say, it is found that, even in case the reverse matrix B has an error, the output of the matrix circuit 6 will accurately coincide with the reference voltage V ref. When the reference level signal V ref is properly set in each comparing circuit, the clamping levels of the respective RGB outputs of the matrix circuit 6 will be able to be independently adjusted.

Thus, in this embodiment, the clamping level of the output of the matrix circuit 6 is controlled by feeding the outputs of the comparing circuits 3a to 3c back to the input capacitors 2a to 2c through the reverse matrix circuit 7 without providing a capacitor for clamping on the output side of the matrix circuit 6. As there is no need of providing a capacitor on the output end side of the IC block 9, no new pin is necessary and this embodiment is adapted to make an IC.

Figure 1B:
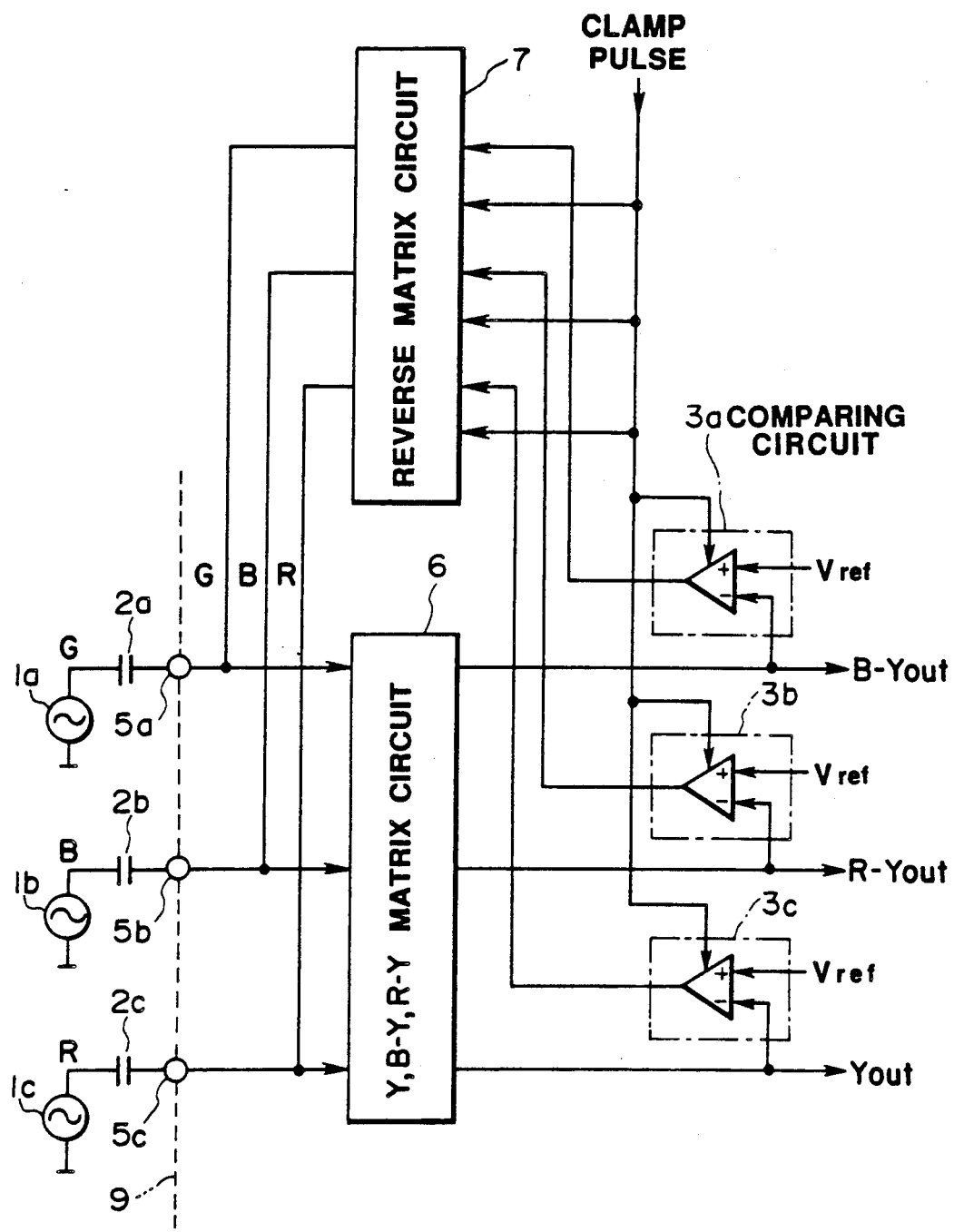
Figure 2:
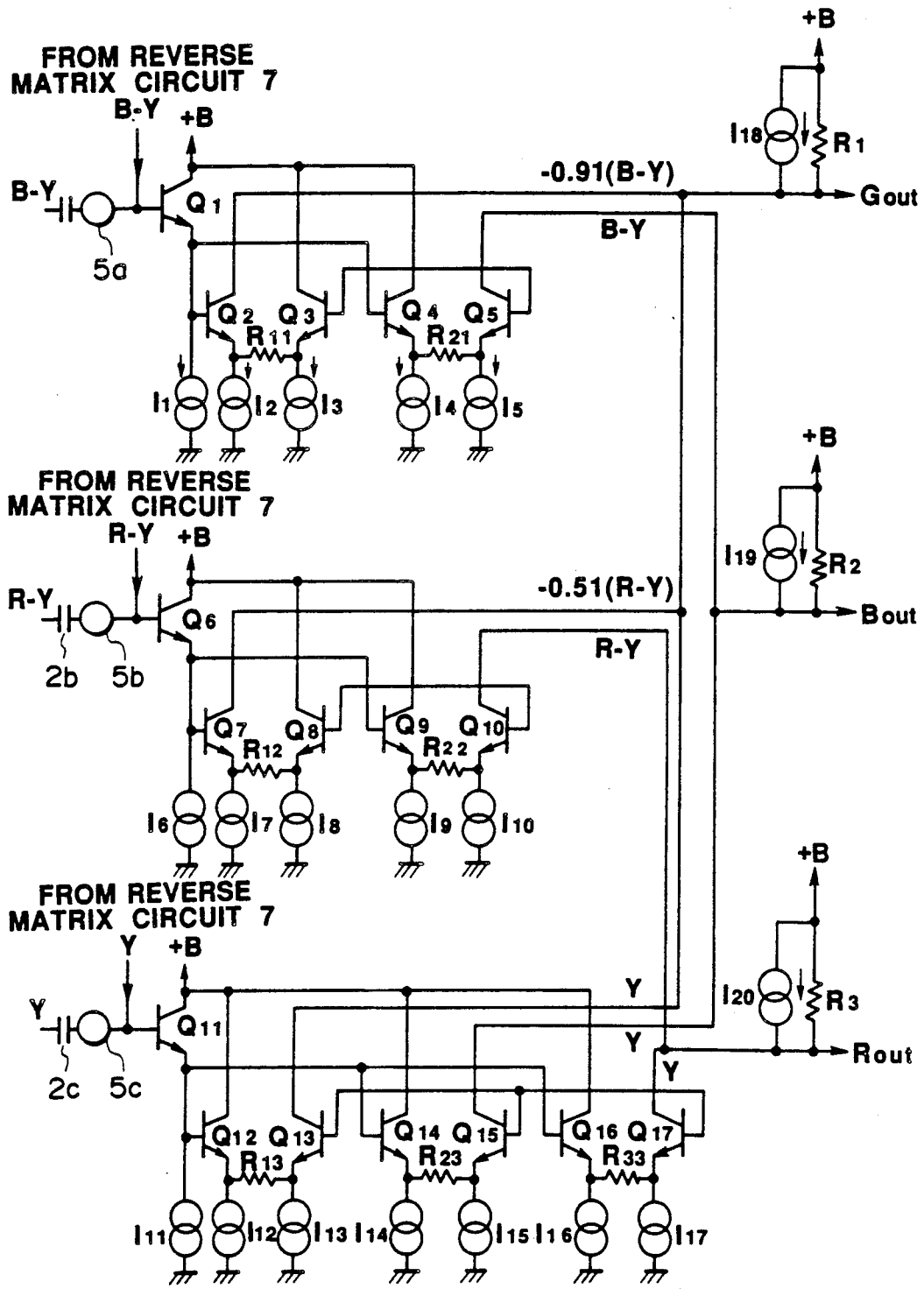
FIGS. 2 to 4 are circuit diagrams showing concrete circuits of the present invention.
Figure 4:
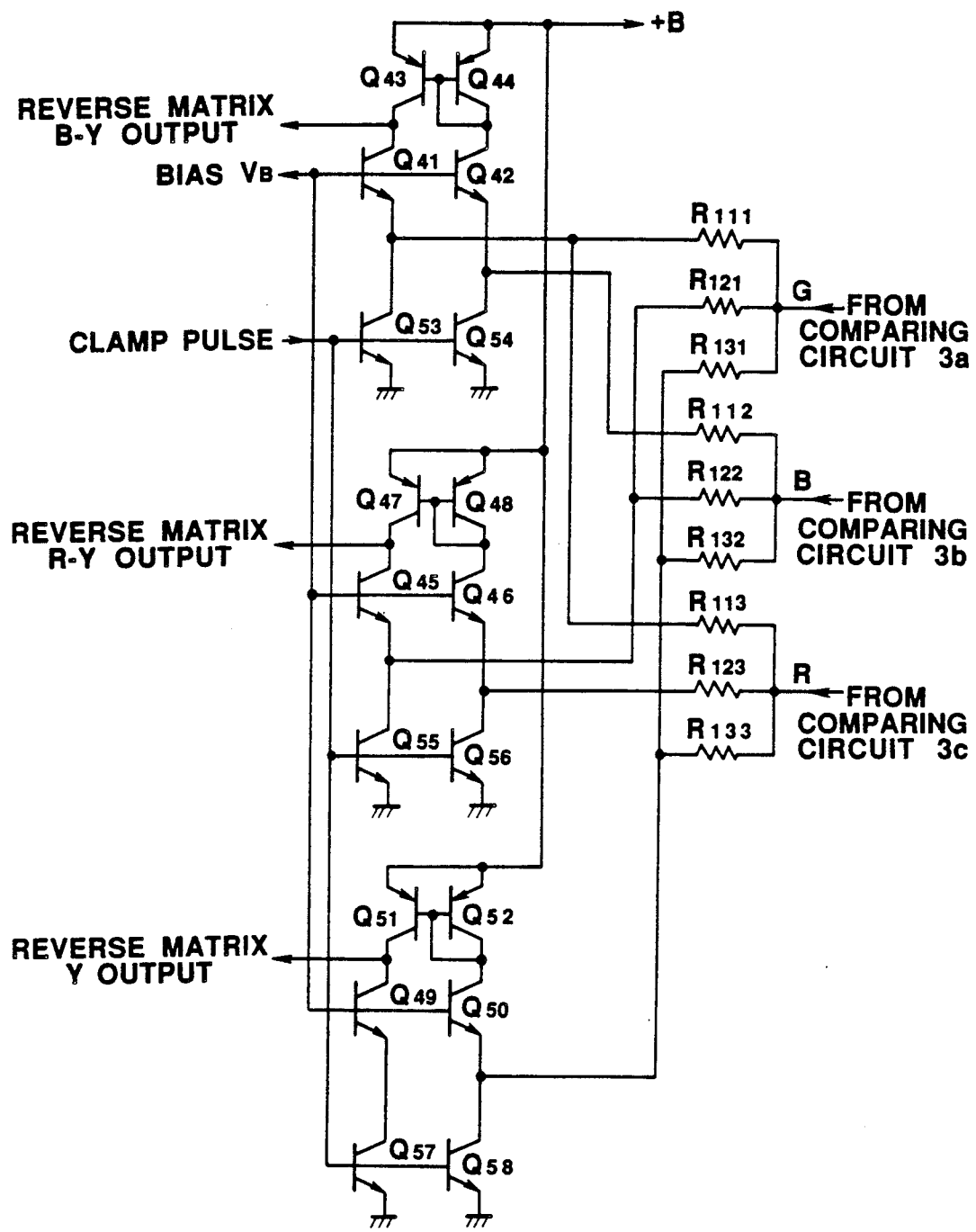
Figure 3:
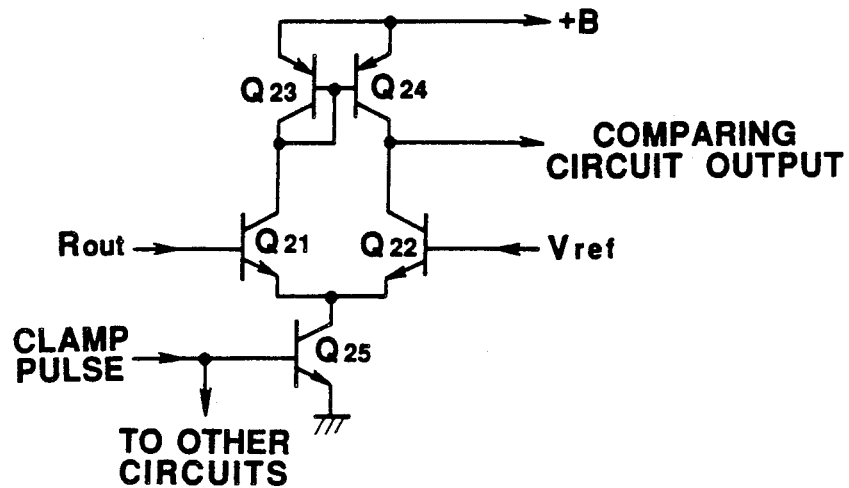
Figure 5:
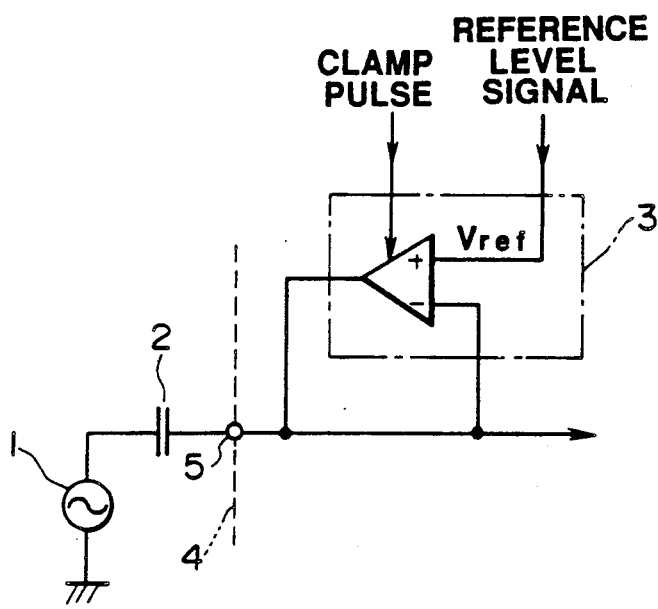
FIG. 5 is a formation diagram showing a basic formation of a clamping circuit.

The concrete circuits of the formation shown in FIG. 1 are shown in FIGS. 2 to 4.

FIG. 2 shows a concrete formation of the RGB matrix circuit 6 in FIG. 1. Respective B-Y, R-Y and Y signals input into terminals 5a to 5c and respective B-Y, R-Y and Y signals from the reverse matrix circuit 7 are given to the bases of respective transistors Q1, Q6 and Q11. The respective transistors Q1, Q6 and Q11 are emitter followers for leading the signals input into the bases out of the emitters. Differential amplifying transistors Q2 and Q3, transistors Q7 and Q8 and transistors Q12 and Q13 corresponding to the respective transistors Q1, Q6 and Q11 mix at predetermined ratios the color difference signals B-Y and R-Y and luminance signal Y on the basis of the transmission equation of the NTSC system. $-0.91$(B-Y) appears at the collector of the transistor Q2. This signal is synthesized with respective signals $-0.51$(R-Y) and Y from the transistors Q7 and Q13 to obtain a primary color output G out.

A B-Y signal is obtained by the transistors Q4 and Q5 and a luminance signal Y is obtained by the transistors Q14 and Q15. These B-Y signal and Y signal are synthesized to obtain a primary color output B out. Also, an R-Y signal is obtained by the transistors Q9 and Q10 and a Y signal is obtained by the transistors Q16 and Q17. These R-Y signal and Y signal are synthesized to obtain a primary color output R out.

The respective differential amplifying transistors Q2 and Q3, transistors Q4 and Q5, transistors Q7 and Q8, transistors Q9 and Q10, transistors Q12 and Q13. Transistors Q14 and Q15 and transistors Q16 and Q17 have resistances R11, R21, R12, R22, R13, R23 and R33 connected respectively to common emitters. Parallel circuits respectively of load resistances R1 to R3 and current sources I18 to I20 are connected between the respective output ends of the respective primary color outputs G out, B out and R out and power source ends +B. Further, current sources I1 to I17 determining direct current operating points are connected respectively between the respective transistors Q1 to Q17 and the reference potential points.

In the above mentioned formation, as the transmission equation of the luminance signal Y by the NTSC system is Y−0.3R+0.59G+0.11B, the matrix formula will be as follows:

$$\begin{bmatrix} G \\ B \\ R \end{bmatrix} = \begin{bmatrix} -0.19 & -0.51 & 1 \\ 1 & 0 & 1 \\ 0 & 1 & 1 \end{bmatrix} \begin{bmatrix} B\text{-}Y \\ R\text{-}Y \\ Y \end{bmatrix} \quad (9)$$

The respective emitter resistances R11 and R21, resistances R12 and R22 and resistances R13, R23 and R33 are set to correspond to the matrix formula of the formula (9). That is to say, if the emitter differential resistance re of the transistor is neglected and the load resistances R1 to R3 are made equal, the current gains of the respective differential transistors Q2 to Q5, Q7 to Q10 and Q12 to Q17 will be proportional to the reciprocals of the emitter resistances R11 to R33 and therefore the values $R_{mn}$ of the respective emitter resistances R11 to R33 will be able to be set by the following formula:

$$R_{mn} = K/a_{mn}$$

wherein K represents any constant and $a_{mn}$ represents an element of the matrix of the formula (9).

By the way, the collector current of either one of a pair of differential amplifying transistors may be made positive. In the case of a differential circuit consisting, for example, of transistors Q2 and Q3, the sign of the collector current of Q2 will be made negative and the sign of the collector current of Q3 will be made positive.

FIG. 3 shows a concrete circuit of the comparing circuit 3c. By the way, the formations of the other comparing circuits 3a and 3b are the same as of the comparing circuit 3c and therefore shall not be illustrated here.

The primary color output R out obtained from the RGB matrix circuit 6 is input into the base of the transistor Q21. The reference level signal V ref is led to the base of the transistor Q22 forming a differential pair with this transistor Q21. The transistors Q23 and Q24 are current mirror circuits and output as a current from the common collector of the transistors Q22 and Q24 the difference between the R out from the transistors Q21 and Q22 and V ref. The transistor Q25 connected to the common emitter of the transistors Q21 and Q22 is operated by a clamping pulse so that, only while the clamping pulse is input, the comparing operation may be made and a current output corresponding to the difference between the R out and V ref may be output from the common collector of the transistors Q22 and Q24.

FIG. 4 shows a concrete circuit of the reverse matrix circuit 7. A B-Y signal is output by the transistors Q41 to Q44 and transistors Q53 and Q54. An R-Y signal is output by the transistors Q45 to Q48 and transistors Q55 and Q56. A Y signal is output by the transistors Q49 to Q52 and transistors Q57 and Q58. For example, in the system of the B-Y signal, the transistors Q41 and Q42 are common base circuit and the transistors Q41 and Q53 are cascade-connected with the transistors Q42 and Q54. A bias voltage $V_B$ is applied to the bases of the transistors Q41 and Q42. A clamping pulse is applied to the bases of the transistors Q53 and Q54. The outputs from the comparing circuits 3a and 3c are applied to the connecting point of the emitter of the transistor Q41 and the collector of the transistor Q53 respectively through R111 and R113. The output from the comparing circuit 3b is applied to the connecting point of the emitter of the transistor Q42 and the collector of the transistor Q54 through a resistance R112. The transistors Q43 and Q44 are current mirror circuits for outputting the currents of the collector outputs from the transistors Q41 and Q42.

The R-Y signal system is also of the same formation. The outputs from the comparing circuits 3a and 3b are applied to the connecting point of the emitter and collector of the cascade-connected transistor Q45 and Q55 respectively through resistances R121 and R122. The output from the comparing circuit 3c is applied to the connecting point of the emitter and collector of the cascade-connected transistors Q46 and Q56 through a resistance R123. Also, the Y signal system is of the same formation. The outputs from the comparing circuits 3a to 3c are applied to the connecting point of the emitter and collector of the cascade-connected transistors Q50 and Q58 respectively through resistances R131, R132 and R133. Thus, in the reverse matrix circuit 7, the transistors Q53 to Q58 will be on during the clamping pulse period. For example, when the transistors Q53 and Q54 are on, the emitter resistances of the transistors Q41 and Q42 will become low in the impedance, then the compared outputs from the comparing circuits 3a to 3c will have currents added and subtracted at ratios based on the resistances R111, R112 and R113 and the color difference signal B-Y will be output from the common collector of the transistors Q41 and Q43. In the same manner, during the clamping pulse period, the color difference signal R-Y will be output from the common collector of the transistors Q45 and Q47 and the luminance signal Y will be output from the common collector of the transistors Q49 and Q51.

Thus, the outputs of the comparing circuits 3a to 3c are given to the respective base earthing transistors at ratios based on the resistances R111 to R113, R121 to R123 and R131 to R133. These ratios are given by the reverse matrix of the formula (9) and can be shown by the below mentioned formula (10):

$$\begin{bmatrix} B\text{-}Y \\ R\text{-}Y \\ Y \end{bmatrix} = \begin{bmatrix} -0.59 & 0.89 & -0.3 \\ -0.59 & -0.11 & 0.7 \\ 0.59 & 0.11 & 0.3 \end{bmatrix} \begin{bmatrix} G \\ B \\ R \end{bmatrix} \quad (10)$$

That is to say, if the respective resistances are represented by $R_{lmn}$, $R_{lmn}$ may be:

$$R_{lmn} = L/b_{mn}$$

wherein L represents any constant and $b_{mn}$ represents an element in the formula (10). By the way, L may be varied for each element of the matrix. Also, one of the two emitters of the common base circuit may be selected to be positive for the direction of the input current of the common base circuit. For example, if the current input into the emitter of the transistor Q41 is negative, the current input into the emitter of the transistor Q42 will be positive.

Thus, when the outputs from the comparing circuits 3a to 3c are matrix-synthesized and the synthesized current is fed back to the capacitors 2a to 2c connected on the input side of the RGB matrix circuit 6, the direct current level of the primary color output of the RGB matrix circuit 6 and the reference signal level will be able to be made to coincide with each other. Also, this invention can be applied to the matrix circuit which produces luminance signals and color-difference signals form primary color signals. As shown in FIG. 1(B), G, B and R signals are fed into terminals 5a, 5b and 5c, respectively, and these signals are converted into B-Y, R-Y and Y signals and supplied by matrix-processing in the Y, B-Y and R-Y matrix circuit 6'. The reverse matrix circuit 7 feeds G, B and R signals back to the Y, B-Y and R-Y matrix circuit 6' by reverse matrix-processing of the outputs of the comparing circuits 3a, 3b and 3c. Therefore, the direct current level of the luminance signals and the color-difference signals B-Y and R-Y can be made to coincide with the reference signal level.

In the above, the explanation has been made on the basis of a concrete circuit example but this invention is not limited to it and can be realized by any other various circuits. For example, in the matrix circuit, currents are synthesized but the output may be obtained by synthesizing voltages. The comparing circuit outputs a current but may output a voltage. Such other modifications as the polarity and the reverse formation and combination of an NPN transistor and PNP transistor are all included in this invention. The reference voltage V ref has been described as a common reference voltage of the respective comparing circuits but need not always be so and a predetermined reference level signal may be used for each comparing circuit. In such case, when each reference level signal is properly set, the output level of the circuit will be able to be freely adjusted. Also, the 3×3-matrix has been explained but the invention is not limited to it but can be applied to various matrices in the same manner.

In short, formations in which an error in a matrix circuit is detected by a comparing circuit provided on the output side of the matrix circuit and the error is fed back to an input capacitor are all included in this invention.

Thus, it is apparent that, in the present invention, working modes different in a wide range can be formed on the basis of the present invention without deviating from the spirit and scope of the invention. The invention is not restricted by its specific working modes except being limited by the appended claims.

What is claimed is:

1. A clamping circuit comprising:
    a clamping and coupling input capacitor giving an input signal to a first signal processing means making a predetermined signal process;
    a comparing means for comparing levels of the output of the first signal processing means and a predetermined reference level signal and outputting a compared output; and
    a second signal processing means for making the compared output a signal process reverse to the signal process of the first signal processing means and feeding the compared output back to the input capacitor.

2. A clamping circuit according to claim 1 wherein the input signal has an alternately varying signal period and a flat period in which a level is constant.

3. A clamping circuit according to claim 2 wherein the comparing means compares the output of the first signal processing means and the predetermined reference level signal with each other and outputs the compared output.

4. A clamping circuit according to claim 1 wherein the first signal processing means is a matrix circuit and the second signal processing means is formed of a reverse matrix of the matrix circuit.

5. A clamping circuit according to claim 4 wherein the input signals are color difference signals R-Y and B-Y and a luminance signal.

6. A clamping circuit comprising:
    first to third capacitors passing respectively alternating current components of color difference signals B-Y and R-Y and a luminance signal Y;
    first to third comparing circuits comparing R, G and B outputs from a matrix circuit matrix-processing signals from the first to third capacitors with a predetermined reference level signal respectively in a pedestal period and outputting compared outputs; and
    a reverse matrix circuit formed of a reverse matrix for the matrix circuit, matrix-processing the outputs of the first to third comparing circuits and feeding the color difference signals B-Y and R-Y and luminance signal Y back to the first to third capacitors.

7. A clamping circuit comprising:
    first to third capacitors passing respectively alternating current components of R, G and B signals;
    first to third comparing circuits comparing color difference signals B-Y and R-Y and a luminance signal Y from a matrix circuit matrix-processing signals from the first to third capacitors with a predetermined reference level signal respectively in a pedestal period and outputting compared outputs; and
    a reverse matrix circuit formed of a reverse matrix for the matrix circuit, matrix-processing the outputs of the first to third comparing circuits and feeding the R, G and B signals back to the first to third capacitors.

* * * * *